Feb. 21, 1961 W. B. LLOYD 2,972,338
PRESSURE DERIVATIVE FEEDBACK VALVE
Filed Dec. 14, 1956 3 Sheets-Sheet 1

Fig. I.

WITNESSES:

INVENTOR
Wayne B. Lloyd
BY
ATTORNEY

United States Patent Office 2,972,338
Patented Feb. 21, 1961

2,972,338

PRESSURE DERIVATIVE FEEDBACK VALVE

Wayne B. Lloyd, Catonsville, Md., assignor to Westinghouse Electric Corporation, East Pittsburgh, Pa., a corporation of Pennsylvania Filed Dec. 14, 1956, Ser. No. 628,432

10 Claims. (Cl. 121—41)

This invention relates to a multistage pressure derivative feedback fluid flow control valve providing rapid pressure response while maintaining adequate damping.

Hydraulic servo-valves of the type here under consideration generally comprise a valve having a pressure port connected to a source of hydraulic pressure, two ports connected to opposite sides of a piston or a similar work device, and at least one drain port connected to a sump or other accumulator associated with the fluid flow pressure source. Such devices are described in the article "Electro-Hydraulic Servo Systems," by D. G. O'Brien and R. D. Atchley, appearing in Electric Manufacturing of April 1954, pages 89–96. A movable valve element, or spool, within the valve chamber gates the flow of hydraulic fluid from the pressure port to one or the other of the work ports and from the work port to which fluid pressure is not applied to one of the drain ports. The work port to which the hydraulic pressure port is coupled is determined by moving the spool in one direction or the other from a given central position. At page 95 of the aforementioned article, there is described a servovalve, the movement of the spool of which is controlled by metering the flow of fluid from a chamber associated with one end of the spool. The fluid pressure in the chamber is balanced by a spring which exerts biasing pressure against the opposite end of the spool. The fluid flow from the chamber is controlled by a spring biased flapper or vane type valve, the relative position of which, with respect to an orifice opening into the chamber, is controlled by electromagnetic means associated therewith.

When valves of this type are used in control systems involving a closed loop (that is, output response being used to alter system input control), the natural frequency of the valve-actuator response (caused by fluid compressibility and mechanical compliance) may impose a serious problem on the stability of the system. Invariably, the valve attempts to make immediate response to the levels of input control selection causing the valve to over-control and then oscillate to its selected or desired output level. These oscillations may cause a closed loop system utilizing the valve, to become unstable and thus be inoperative.

Several methods of compensation for closed loop instability have been previously attempted. One method is to underlap the valve; that is, make the lands of each spool of less length with respect to its associated openings, such that the passages are constantly open, allowing limited hydraulic fluid flow. This system, however, has the disadvantage of wasting hydraulic fluid and hence power while the valve is in the neutral or standby condition. This system additionally lowers the valve pressure gain since the amount of actuator differential pressure per unit of spool displacement is lowered.

Another way to control the oscillations of servo-valves used in conjunction with inertia loads is to introduce slippage or internal leakage into the controlled work actuator. This type of damping of oscillations is poor since its effectiveness changes with temperature changes. Another disadvantage is that fluid flow occurs whenever torque is produced, hence there is a power loss and a reduction in pressure gain.

The introduction of pressure feedback in the control of a fluid actuator control valve during its transient stage of operation to reduce or eliminate over control oscillations also introduces the disadvantage in some cases of low pressure gain and thus slower work actuator response.

In practicing this invention, a pressure derivative valve providing a modified pressure feedback is described. This valve is provided with several stages, the first of which delivers oppositely variable pressures for the control of a second valve, which in turn provides working fluid pressures to a work actuator. The second stage valve is a control spool valve which is displaced in response to the first stage supplied oppositely variable pressures. The second stage spool valve is also provided with a work actuator pressure feedback control modified by pressure derivative pistons for controlling the transient condition of the work actuator (and second stage control valve) to prevent the work actuator from passing the velocity and pressure level selected by the first stage actuator without affecting its steady state pressure gain.

It is, therefore, an object of this invention to provide a pressure drivative control valve having pressure feedback control through a pressure derivative device causing the valve steady state pressure gain to be unaffected while at the same time being adequately damped in high frequency oscillatory operation.

It is an additional object of this invention to provide an improved high gain valve device with adequately damped velocity response which provides for high performance operation.

It is another object of this invention to provide a pressure derivative valve of excellent response and reaction and which is not affected by temperature changes.

Other objects and features will be apparent from the consideration of the following description of this invention when taken with reference to the accompanying drawings; in which.

Similar parts are designated by like reference characters in each of the several views.

Figure 1:
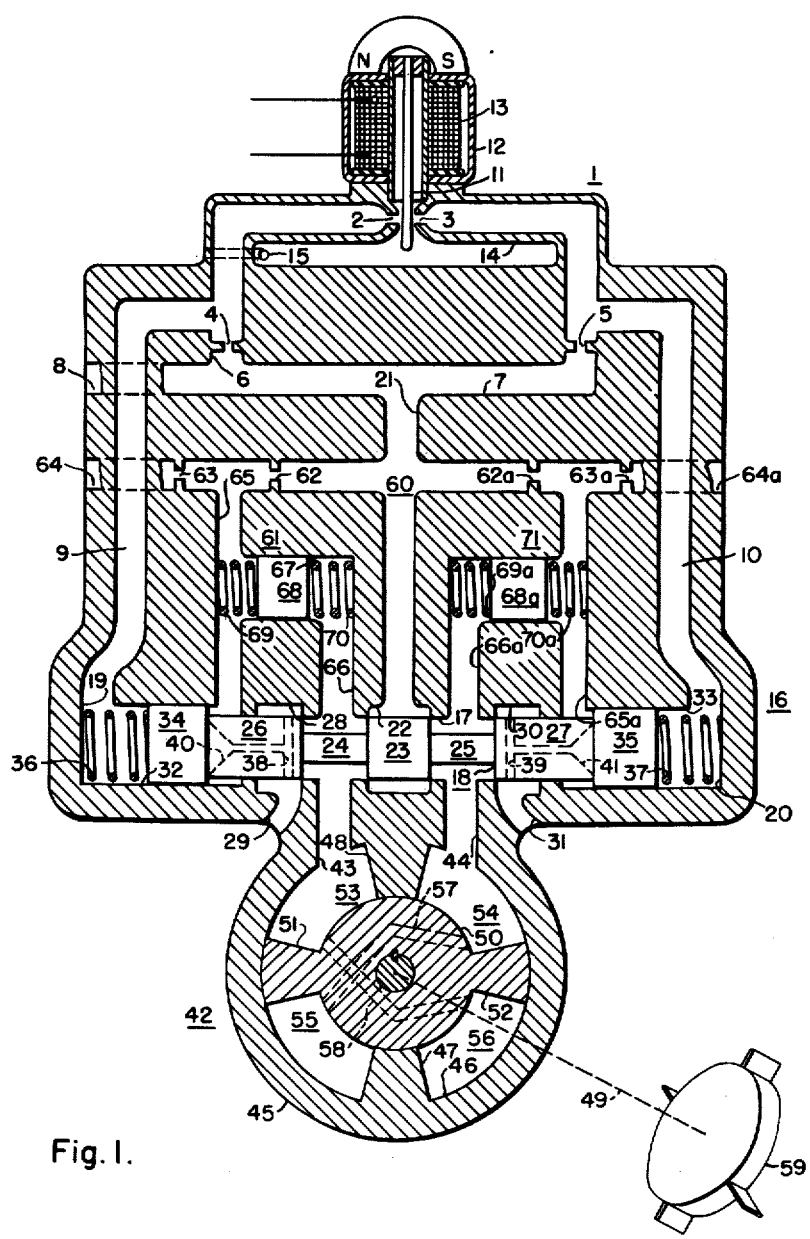
Figure 1 is a view of a preferred embodiment of this invention, partly sectioned to better illustrate the structure.

Referring to Fig. 1, the pressure derivative valve of this invention involves two valve stages and a pressure feedback derivative control. The first stage is used to regulate incoming hydraulic fluid pressure proportional to control circuits supplied from a remote location (not shown). The first stage output pressures are then applied to the second stage comprising a control valve which, in turn, controls fluid flow and pressures to a work actuator. The pressure feedback and derivative control is provided through spring biased pistons which are controlled by work actuator pressures operating through the spring biased pistons to readjust the second stage valve in response to work actuator action.

The first stage comprises a valve body 1 provided with a pair of orifices 2 and 3 placed in spaced-apart close relationship and in opposing positions. The two orifices 2 and 3 are provided with fluid flow through restricted flow control openings 4 and 5, respectively. The restricted openings 4 and 5 are connected through the pipes 6 and 7 to a common source pipe 8 supplied by a suitable source of fluid (not shown). Connected to the pressure pipe at a point between the restricted opening 4 and the orifice 2 is a second stage pressure control pipe 9. Likewise, between the opening 5 and the orifice 3 is a second stage pressure control pipe 10.

Positioned midway between the orifices 2 and 3 is the fluid control vane 11 biased to a mid-point by its own resilience and supported on the magnetic structure 12 of a torque motor control winding 13 which is controlled from some remote location (not shown). Operation of the magnetic structure controlling the fluid control vane 11 is explained in detail in the application to Mark I. Place, Serial No. 502,471, filed April 19, 1955, and entitled "Hydraulic Servo-Valve," which application is assigned to the assignee of this application, now Patent No. 2,824,574, issued February 25, 1958. It is considered sufficient for the purposes of this application to state that the control vane 11 is moved in one direction or the other in response to current flow in one direction or the other in the coil 13.

Fluid flowing from the orifices 2 and 3 is emptied into the reservoir or chamber 14 in the valve body 1 and exhausted from a return pipe 15 to an accumulator (not shown).

A brief explanation of the operation of the first stage will now be presented to better illustrate the response pressure supplied to the second stage. Under conditions of no current flow, it can be seen that fluid from the main supply pipe 8 flows through the supply pipes 6 and 7 through the restricted openings 4 and 5, orifices 2 and 3 in equal portions and into the chamber 14 of return pipe 15. Under these conditions it can be seen that pressures supplied through the pressure supply pipes 9 and 10 feeding the second stage are equal.

If we assume that a current of one polarity is supplied to the control winding 13 deflecting the vane 11 in one direction, say to the left of the center position as shown in the drawing, flow from the orifice 2 is restricted by the vane 11 while at the same time flow from the orifice 3 is relieved by the vane 11. It is apparent, therefore, that under these conditions, and the limited flow through the openings 4 and 5, the pressure in the supply pipe between the restricted opening 4 and orifice 2 will increase while the pressure between the opening 5 and the orifice 3 decreases.

The effects of the pressure changes will be felt in the second stage supply pipes 9 and 10 with the increase in pressure being felt in the pipe 9 and the decrease in pressure being felt in the pipe 10.

It should be clear that if the current supplied to the winding 13 had been of the reverse polarity, the vane 11 would have been deflected in the opposite direction causing restriction of the orifice 3 and the relief of the orifice 2. It should be apparent therefore, that under these conditions, the pressure in the second stage supply pipe 10 to the second stage increases while the pressure in the second stage supply pipe 9 decreases. The changes in pressure in the supply pipes 9 and 10 are proportional to the changes in current supplied to the windings 13 controlling the fluid flow vane 11.

A description of the second stage is set forth in the following paragraphs.

The second stage comprises a body portion 16 having a longitudinal horizontal bore or opening 17 provided with a spool valve assembly generally designated 18 slidably positioned therein. The second stage control supply pipes 9 and 10 are connected to the ends 19 and 20 of the horizontal bore 17. The pressure supply pipe 8 is connected through a pipe 21 to an enlarged peripheral area 22 located at the mid-point of the horizontal bore 17. The spool valve assembly is provided with a center spool member 23 having a land area exactly the length of the peripheral area or opening 22 in the bore 17. In addition, the center spool valve 23 is provided with outstanding arms 24 and 25 having enlarged land areas adjacent their extended ends designated 26 and 27 respectively and being of equal diameter as the center spool 23.

The horizontal bore 17 is provided with enlarged peripheral opening 28 positioned to cooperate with the enlarged end 26 of the center spool arm 24. The peripheral opening 28 is positioned with respect to the enlarged end 26 of the arm 24 such that the edge of the enlarged end 26 closes to the center spool 23 coincides with the edge of the peripheral opening 28 nearest the center peripheral opening 22. Under these conditions the peripheral opening 28 is covered by the enlarged end 26 of the arm 24 keeping fluid flow from the pressure pipe 21 into the peripheral opening 28 to a minimum. The peripheral opening 28 is provided with a connected exhaust return pipe 29.

The enlarged end of the arm 25 is also provided with an associated peripheral opening 30 and like the relationship set forth between the enlarged end 26 and the peripheral opening 28 of the arm 24, the peripheral opening 30 is also covered by the enlarged end 27 of the arm 25 to maintain fluid leakage to a minimum. The peripheral opening 30 is also provided with a flow return pipe 31.

The enlarged ends 26 and 27 of the arms 24 and 25 extend outwardly and horizontally within the bore 17 to the areas 32 and 33 of enlarged diameter with respect to the central bore 17. Positioned within the enlarged diameters 32 and 33 are the end spools 34 and 35, respectively. The end spools 34 and 35 are positioned within the enlarged diameter portion of the horizontal bore adjacent to the ends of enlarged portions 26 and 27, respectively, of the arms 24 and 25. The end spools 34 and 35 are maintained in constant contact with the enlarged ends 26 and 27 of the arms 24 and 25 by the coil springs 36 and 37 and a resulting difference in pressure acting on the respective end areas of the end spools 34 and 35.

The enlarged ends 26 and 27 of the arms 24 and 25 are provided with relief passages 38 and 39, respectively, interconnecting two cone-shaped recesses 40 and 41, respectively, with the peripheral openings 28 and 30, respectively. In this way, it can be seen that the areas adjacent the cone-shaped openings 40 and 41 will be maintained at the exhaust or return pipe pressure level while at the same time, the faces of the end spools 34 and 35 associated with the control pipes 9 and 10 of the first stage are provided with pressures well above the return pipe pressure level. In this manner, the spools 34 and 35 are maintained in firm contact with the ends 26 and 27, respectively, of the arms 24 and 25.

The pressure zone between the center spool 23 and the enlarged end 26 of the arm 24 is then connected to a work actuator 42 by a control port 43. Likewise, the pressure zone positioned between the central spool 23 and the enlarged end 27 of the arm 25 is connected to the work actuator 42 through an actuator port 44.

The work or power actuator 42 controlled by the two previously mentioned stages preferably may take the form of a rotary vane type of actuator provided with a body portion 45 having a central generally circular opening 46 and a pair of opposing inwardly extending teeth 47 and 48. Positioned within the opening 46 and movable on a central shaft 49 is a movable abutment or piston member in form of a rotary vane member 50 having integral outwardly extending teeth 51 and 52 positioned on opposing sides of the rotary vane member 50. The body portion 45, teeth 47 and 48 extend inwardly a sufficient distance to cooperate with the rotary vane member 50 and the rotary vane member teeth 51 and 52 extend outwardly to the walls of the central cylindrical opening 46. With the rotary vane member 50 rotated to a position in which the teeth 51 and 52 are positioned 90° from the teeth 47 and 48, the central opening 46 of the body 45 becomes divided into four equal chambers. These chambers are the chambers 53, 54, 55 and 56. The second stage control port 43 is connected to the chambers 53 and 56 and the pressure port 44 is connected to the other two of the four chambers as described hereinafter.

With the pressure supply port 43 connected directly into the chamber 53 and the pressure supply port 44 connected directly into the chamber 54, it can be seen that the chambers 55 and 56 have no direct connection with the pipes 43 and 44. For this reason, the openings 57 and 58 interconnecting the chambers 53 with 56 and 54 with 55, respectively, are provided. It can be seen, therefore, that fluid entering through the supply pipe 43 into the chamber 53, interconnecting pipe 57 and chamber 56 would cause rotation of the vane member 50 and its teeth 51 and 52 in a counterclockwise direction. This action is made with the assumption that fluid can flow out of the chambers 54 and 55 into the port 44. If increasing fluid pressure, however, is introduced through the tube 44 into the chambers 54 and 55, and pressure is relieved from the chambers 53 and 56, it can be seen that clockwise rotation of the rotary vane member 50 would occur.

Since the rotary vane member is a work actuator, it is shown connected to a load 59 of any suitable type, usually inertial in character.

To provide the second stage valve assembly 18 with a rapid, but controlled response, the pressure derivative assembly 60 is introduced. The pressure derivative assembly 60 in this embodiment is divided into two identical portions. For this reason, one portion will be described in detail with the understanding that the second one is identical.

The pressure derivative assembly portion 61 comprises a pair of orifices 62 and 63 connected between the pressure supply pipe 21 and a return pipe 64. Passage of fluid from the pressure supply pipe 21 through the two orifices to the return pipe 64 is metered such that the pressure in the zone between the orifices 62 and 63 normally is approximately one half of the supply pressure supplied by the pressure supply pipe 21. A pressure derivative pipe 65 connects this reduced pressure zone (between the orifices 62 and 63) with the enlarged end bore 32 of the horizontal bore 17. It can be seen therefore that pressure introduced by the derivative pipe 65 into the enlarged end portion 32 of the bore 17 acts on a differential area of the end spool 34 of greater diameter and not covered by the enlarged end 26 of the central spool 23.

The pressure zone between the central spool 23 and an enlarged end portion 26 of the arm 24 is connected to the pressure derivative pipe 65 through a feedback control pipe 66 and a derivative piston bore 67. Positioned within the derivative piston bore 67 is a derivative piston 68 biased to a central position by the centering springs 69 and 70 positioned on opposite sides of the derivative piston 68.

The precise value of the pressure normally existing in the zone between orifices 62 and 63 is not critical, however, the value of this pressure establishes a datum value for the pressure derivative feedback pressure which is experienced by the differential area of the end spool 34. If this feedback pressure is normally of a value greater than zero, it enables same to be varied above and below its datum value, and this enables the obtaining of a push-pull effect on the spool valve assemblage, where, as illustrated and described subsequently, an oppositely-varied feedback pressure is experienced by a corresponding differential area on end land 35. Furthermore, since the central spool 23, in the illustrated device, is of the same diameter as end portion 26, for example, substantially the same size leakage paths from supply pipe 21 into pipe 66 and from 66 into return pipe 21 exists, so that in neutral position of the spool valve assemblage pressure in pipe 66 tends to be maintained at approximately one-half of the supply pressure. Under these circumstances it is desirable that the datum value of the pressure derivative feedback pressure in pipe 65 at one side of piston 68 equal the neutral pressure in pipe 66, one-half supply pressure, since this establishes a normal pressure balance across such piston.

The remaining derivative control portion 71 of the derivative assembly 60 is identical with the previously described derivative piston portion 61 and bears like reference characters with the previously described structure, with the exception of a lower case "a" added to each member. In this case, however, the derivative assembly 71 is associated with the enlarged bore portion 33 and the end spool 35 of the spool valve assembly 18 rather than the enlarged bore portion 32 and end spool 34.

Operation of the pressure derivative valve will now be explained.

Under static conditions with no current being supplied to the winding 13 of the first stage, the pressure is introduced into the control pipes 9 and 10 and will be of equal value as explained hereinbefore. With the pressures supplied to the second stage by the control pipes 9 and 10 being of equal value and the springs 36 and 37 also being of equal value and opposing, it can be seen that the spool valve assembly will be centered with the central spool 23 exactly covering the peripheral enlarged opening 22 and the enlarged end portions 26 and 27 of the arms 24 and 25 will have their inward edges matching the inward edges and covering the peripheral openings 28 and 30, respectively.

Under these conditions no appreciable fluid flow will occur from the fluid pipes 8 and 21 through the peripheral opening 22 past the spool valve 23 and into the rotary vane actuator 42. However, due to necessary clearance in the valve zone, seepage does take place and pressure will build up in the chambers of the rotary work actuator. Since seepage also occurs past the enlarged end portions 26 and 27 of the arms 24 and 25 into the peripheral openings 28 and 30 and the exhaust return pipes 29 and 31, it has been found that the pressure within the rotary vane actuator under static conditions will be approximately one half of the supply pressure introduced into the supply pipe 8. This is a desirable condition since it maintains an initial bias on the rotary work actuator providing for a more rapid response to any change in pressures introduced by the first and second stages of the pressure derivative valve.

If we assume that a control current is supplied to the torque motor winding 13 of the first stage causing the control vane 11 to deflect to its left restricting the orifice 2 and relieving the orifice 3, it will be seen that the pressure within the supply pipe 9 for the second stage will increase while the pressure supplied to the second stage by the supply pipe 10 will decrease in an amount proportional to the amount of current supplied to the winding 13. This change of pressure supplied to the second stage causes a pressure increase within the chamber formed by the enlarged end portion 32 of the central bore 17 and a decrease in it within chamber formed by the enlarged end portion 33 of the central bore 17. This causes a physical displacement of the spool valve assembly 18 to the right allowing supply fluid to flow past the spool valve 23 into the chamber formed by the central bore 17, the central spool valve 23 and the enlarged end portion 26 of the arm 24. This increase in flow and result in rise of fluid pressure is then introduced through the pressure supply port to the work actuator chambers 53 and 56. At the same time the enlarged end portion 27 of the arm 25 opens the chambers 54 and 55 of the work actuator 42 to the return pipe 31. This fluid path can be traced from the chamber 55, through the interconnecting pipe 57 into the chamber 54, the fluid supply port 44 past the enlarged end 27 of the arm 25, into the peripheral openings 30 and out through the return pipe 31. The introduction of increased fluid pressure within the chambers 53 and 56 of the rotary vane work actuator 42 causes counter-clockwise rotation of the rotary vane with nearly instantaneous response since the rotary vane actuator is under initial pressure.

Initial displacement of the spool valve assembly 18 to the right is considered to be proportional to the current supplied to the coil 13 because of the linear force gradient due to the springs 36 and 37. As this displacement takes place pressure builds up in the chambers 53 and 56 and consequently within the chamber formed by the central spool 23 and enlarged end portions of the arm 24 within the central bore 17. At the same time, pressure reduction takes place wtihin the chamber formed by the central spool 23 and the enlarged end portion 27 of the arm 25 positioned within the bore 17. The increase in pressure within the first mentioned chamber is also introduced through the pipe 66 to the derivative piston 68 of the pressure derivative portion 61. This displaces the piston 68 to the left causing a transient increase in the pressure within the pressure derivative pipe 65 which was previously supplied with pressure approximately one half that of the supply pressure. This increase of pressure in the pressure derivative pipe 65 is introduced into the enlarged bore portion 32 of the bore 17 to the right of the end spool valve 34. It can be seen therefore, that this pressure acts on the differential area of the end spool valve 34 that extends outwardly beyond the large portion 26 of the arm 24. The transient increase in pressure on this differential area causes the end spool valve and the associated valve assembly 18 to move momentarily to the left reducing the flow of fluid into the rotary work actuator through the control port 43. As the work actuator pressure nears its commanded level, motion of the spool 68 ceases. The transient pressure in passage 65 then leaks off through orifice 63 and no further effect of work actuator pressure is felt in passage 65 unless work actuator pressure is changing with respect to time; hence, the term pressure derivative feedback.

Since the feedback pressure from the rotary vane actuator 42 is introduced to the differential spool area of the spool 34 through the pressure derivative piston 68 the effect of the feedback on the end spool valve 34 is present only when actuator pressure is experiencing a rate of change. Therefore the steady state pressure gain of the valve is unaffected. For transient conditions, pressure developed in passage 65 serves to control the porting of fluid into the work actuator so that excessive energy is not stored in oil compresssibility and in mechanical compliance within the actuator. In this manner overcontrol and overshooting of commanded velocity level is prevented.

It will be apparent from the foregoing that the degree of pressure in chamber 65 will be proportional to the rate of change in delivery pressure in chamber 53 and that the pressure derivative means may be said to respond to such rate of change.

Similarly, the actuator chamber pressure existing in the chambers 54 and 55 and felt in the previously cited reduced pressure chamber through the work pressure port 44 is exerted against equal areas of the central spool 23 and the enlarged end portion 27 of the arm 29 with no effect in the spool assembly 18 displacement. This decrease in pressure, however, is also felt by the pressure derivative piston 68a of the pressure derivative portion 71 causing it to be displaced to the left due to the reduction of pressure within the pressure feedback pipe 66a. The displacement of the pressure derivative piston 68a to the left causes a transient reduction in pressure within the derivative feedback pipe 65a and a resultant decrease in pressure on a differential area of the end spool 35. This additionally aids in displacing the spool assembly 18 to the left and also aids to reduce fluid flow into the work actuator preventing overcontrol and hunting. Reduction of flow as the work actuator approaches the desired velocity causes a more gradual change in work actuator chamber pressure which prevents excessive storage of energy within the fluid within the actuator chamber as the actuator approaches the desired velocity. The difference in pressure is reduced due to diminished load acceleration causing the spool to again move to the right to a position equivalent to its initial displacement to the right. Thus, the rotary actuator approaches the desired velocity without overshooting.

In summation, it can be seen that this increased build-up of actuator pressure against the differential land areas of the end spool 34, which respect to the enlarged end portion 26 of the arm 24, through the pressure derivative piston 68 and the decrease of actuator pressure against the differential land area of the spool 35, with respect to the enlarged end portion 27 of the arm 25, through the differential piston 68a causing a reduction in control fluid in the rotary work actuator at the proper time to prevent overcontrol, can be considered a pressure feedback (modified by a pressure derivative valve) which is responsive to change in delivery pressure and effective proportionately to the rate of such change against the spool valve due to rotary actuators resistance to motion.

Figure 2:
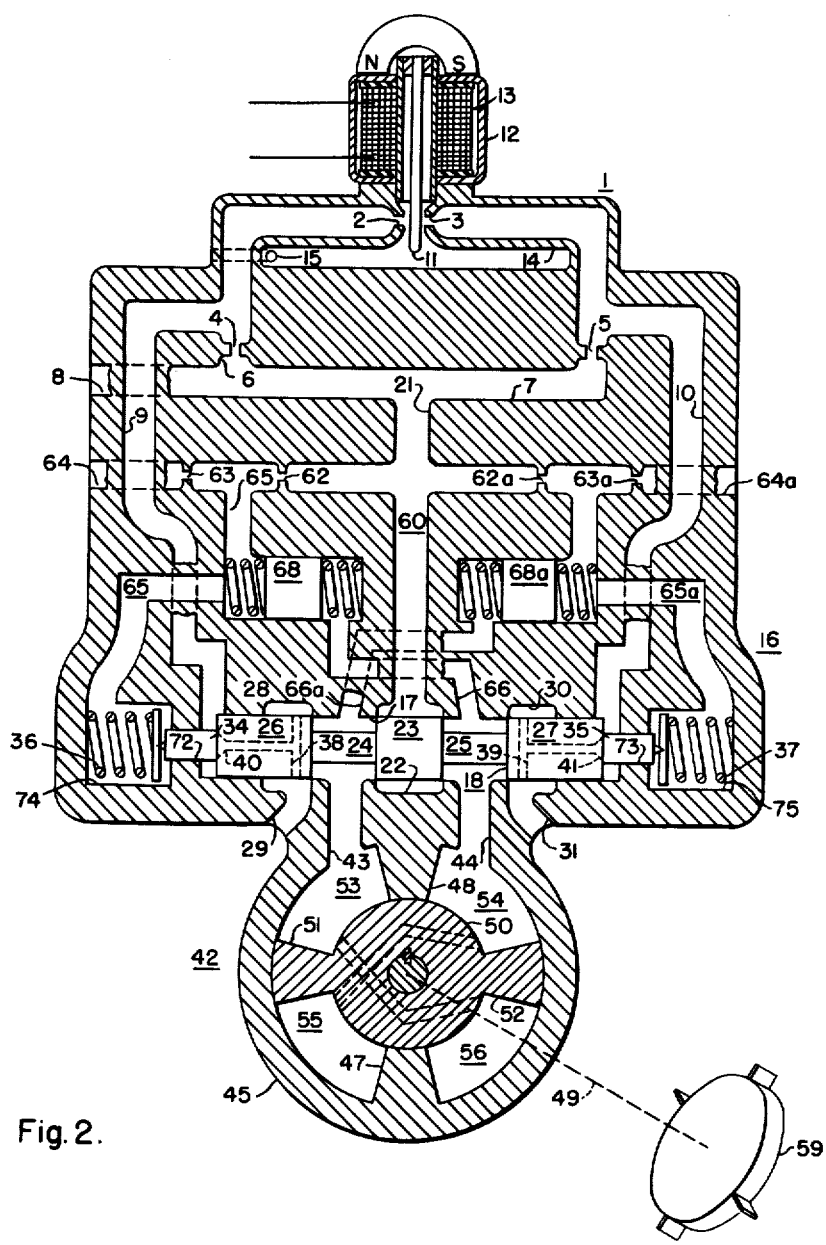
Fig. 2 is a view of another embodiment of this invention, partly sectioned to better illustrate the structure; and, Fig. 3 is a view of still another embodiment of this invention, partly sectioned to better illustrate the structure.

In the embodiment shown in Fig. 2, the first stage of the valve is identical with that of Fig. 1. In the valve assembly 18 of the second stage, however, the end spools 34 and 35 associated with the enlarged ends 26 and 27 of the arms 24 and 25 are of a diameter considerably smaller than the end portions 26 and 27. The end spools, however, in this case are also supported within portions of the central bore 17 of reduced diameter and are indicated as being bores 72 and 73, respectively.

In this species, the control pressures delivered by the pipes 9 and 10 of the first stage are introduced into the bore 17 at the ends of the enlarged ends 26 and 27 of the arms 24 and 25 rather than into the end chambers 19 and 20 of the central bore 17 as shown in Fig. 1. Displacement pressures are then introduced on the enlarged ends 26 and 27 of the spool valve 23 rather than on the end spools 34 and 35.

The pressure feedback assembly 60 is identical with that of Fig. 1 with the exception that the pressure derivative pipes 65 and 65a of this species are connected to the outer chambers 74 and 75 housing the centering springs 36 and 37 of the spool valve assembly 18.

It can be seen, therefore, that pressure derivative feedback pressures are introduced into the pipes 65 and 65a and chambers 74 and 75 of the spool valve second stage and acts on the reduced diameter ends of the end spools 34 and 35. It is pointed out at this time, that the area of the spools 35 and 34 subject to the pressure derivative feedback pressures are approximately the same as that of the differential area of the end spools 34 and 35 of Fig. 1. It should, therefore, be clear that action of the spool valve assembly 18, as shown in Fig. 2, is identical with that of Fig. 1 in operation. The advantage realized in an assembly such as this, is one of structural relationship rather than a change in function.

Figure 3:
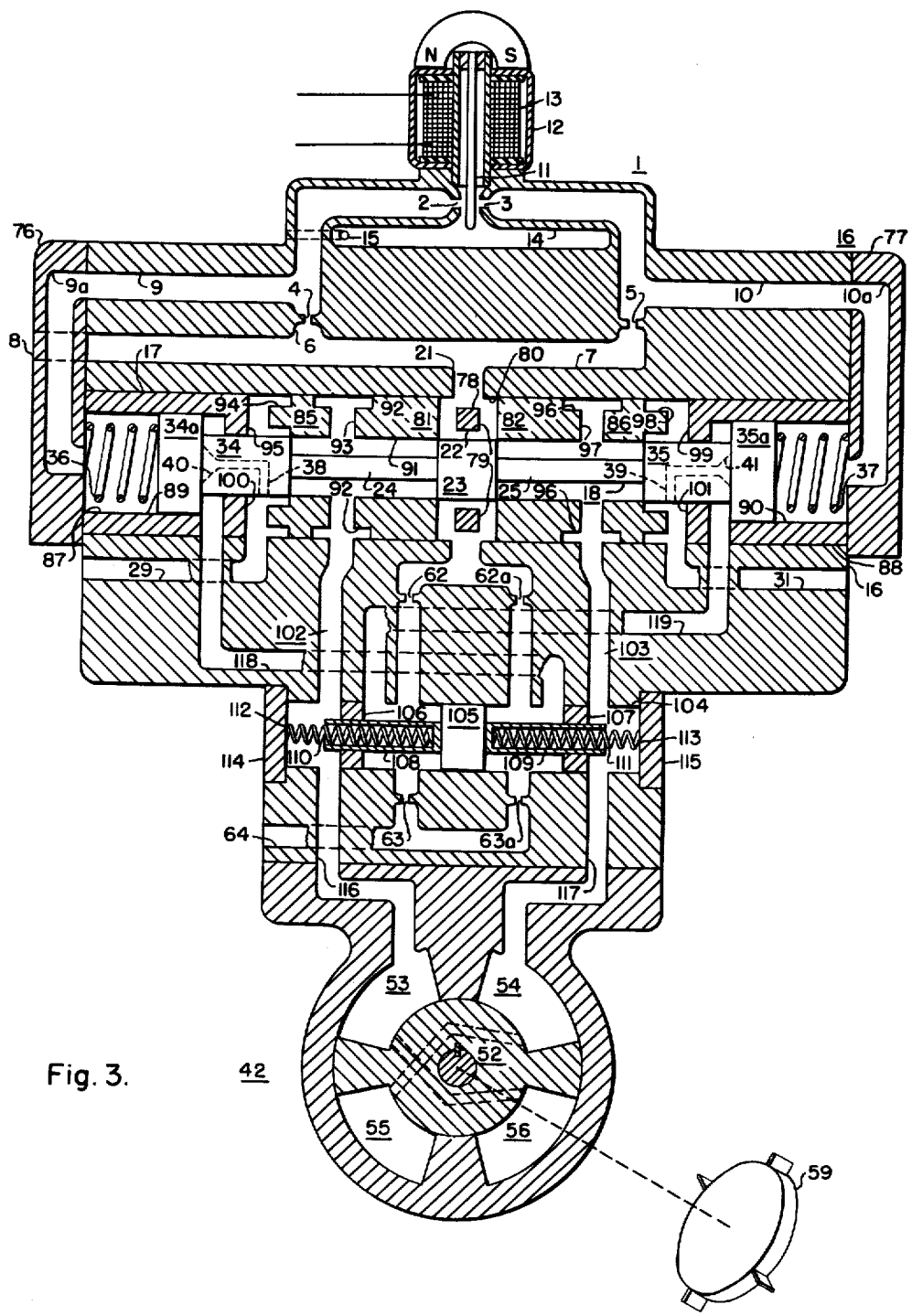

The embodiment shown in Fig. 3 is similar to that shown in Fig. 1 with the exception that the second stage spool valve assembly is shown in a typical assembly relationship showing the parts of the assembly in assembled position. In addition, the derivative feedback control involves a single piston acted on by both an increase and a decrease in pressure rather than two pistons, one responding to an increase and the other responding to a decrease in pressure.

The first stage of Fig. 3 is identical with that of Fig. 1 providing second stage control pressures within the pipes 9 and 10 associated with the pipes 9a and 10a of the end caps 76 and 77, respectively. The end caps 76 and 77, when placed in position on the valve body 16 position the exhaust ends of the control pipes 9a and 10a centrally of the longitudinal bore 17. Inserted into the opening 17 are a plurality of guides and spacers. Centrally positioned along the length of the longitudinal opening or bore 17 is a spacer 78 provided with radial openings 79. The openings 79 are used to provide passage for fluid from the supply pipes 8 and 21 cooperating with a peripheral opening 80 (formed by the spacer 78) into a central opening 22 within the spacer 78.

Positioned to the right and left of the spacer 78 are three pairs of valve guides for a valve assembly 18. The first pair of valve guides comprise the members 81 and 82, and are situated with the member 81 to the left of the spacer 78 and the member 82 to the right of the spacer 78. Positioned to the left of the member 81 and to the right of the member 82 are the valve guides 85 and 86, respectively. The valve guides 85 and 86 make up the second pair of the previously mentioned valve guides. The first two pairs of valve guides 81, 82, 85 and 86 and the spacer 78 may be fastened together by any suitable means such as welding or brazing. Positioned to the left of the valve guide 85 is the valve guide 87 and positioned to the right of the valve guide 86 is valve guide 88. The valve guides 87 and 88 make up the third previously mentioned pair of valve guides and also complete the full length occupation of the longitudinal bore 17. These guides (87 and 88) are pressed into firm contact with the guides 85 and 86 but are not fastened.

The valve guides 81, 82, 85, 86, 87 and 88 are provided with a central longitudinal bore 91. In addition, the valve guides 87 and 88 are provided with enlarged bore areas of a diameter greater than the central bore 91 and extending from the central bore 91 to the left and right, respectively, for the remainder of the length of the respective valve guides.

The valve guides 81 and 85 are provided in their adjoining areas with a peripheral cut away portion or groove 92 connected to the central bore 91 by radial passages 93. Likewise, the valve guides 85 and 87 in the areas adjoining are provided with a peripheral groove 94 connected to the central bore 91 by radial passages 95.

In a similar manner, the valve guides 82 and 86, in their adjoining areas are provided with a peripheral cut away portion 96 connected to the central bore 91 by radial passages 97. Likewise, the valve guides 86 and 88 in their adjoining areas are provided with a peripheral cut away portion 98 connected to the central bore 91 by radial openings 99.

The radial openings 95 and 99 are provided with enlarged cut away portions 100 and 101, respectively, in their areas adjacent the central bore 91.

Positioned within the central bore 91 and having a land area exactly matching the cut away portion 22 of the spacer 78 is a central spool valve 23 having a pair of arms 24 and 25 extending to the left and right, respectively. Integral with the arm 24 and to the left of the arm is an end spool valve 34 having a diameter equal to the central bore diameter 91 and having there against an associated enlarged end spool portion 34a having a diameter equal to the enlarged diameter 89 of the end valve guide 87.

Likewise, the arm 25 has integral therewith an end spool valve 35 of a diameter equal to the central bore 91 and having associated thereagainst an enlarged end spool portion 35a of a diameter equal to the enlarged diameter 90 of the central bore in the end valve guide 88. The ends of the end spools 34 and 35 are provided with cone-shaped recesses 40 and 41, respectively. Positioned within the end spool valves 34 and 35 are the fluid passages 38 and 39, respectively, for providing passages between the cone-shaped recesses 40 and 41, respectively, and the radial openings 95 and 99, respectively.

The valve body 16 is provided with fluid exhaust passages 29 and 31 for connecting the peripheral ring openings 94 and 98 to return pressure fluid pipes (not shown). It can be seen therefore, that with the end spool portion 34a and 35a being subject to pressures well above the return fluid pressures and the recesses 40 and 41 of the arms 24 and 25 being subject to return pressures, that the end spool portions 34a and 35a and central spool 23 will work and act as a unitary member, even though it is, in actuality, three separate pieces.

The pipes 102 and 103 connect the peripheral valve guide openings 92 and 96 to a longitudinal horizontal bore 104 housing a pressure derivative piston 105. The horizontal bore 104 of the pressure derivative piston 105 is provided with a pair of piston guides 106 and 107. The piston guides 106 and 107 are placed on opposite sides of the piston 105 and are provided with central openings of reduced diameter for cooperating with outstanding arms 108 and 109, respectively of the piston 105. The outstanding arms 108 and 109 of the piston 105 are provided with spring seating recesses 110 and 111, respectively, for the central biasing springs 112 and 113, respectively. The springs 112 and 113 act to position the piston 105 in a central location between the guides 106 and 107.

The horizontal bore 104 is provided with suitable end sealing caps 114 and 115 on its left and right ends, respectively. The end sealing caps 114 and 115 in cooperation with the piston guides 106 and 107 and the piston 105 act to divide the horizontal bore 104 into four separate pressure chambers.

The two outer chambers formed by the valve guides 106 and 107 in cooperation with the respective end caps 114 and 115 are connected to a work actuator 42 through the pipes 116 and 117, respectively. It is pointed out at this time that the second stage pipes 102 and 103 also connect within the respective end chambers just described. The pipes 116 and 117 connect into the work actuator pressure chambers 53, 56 and 54, 55, respectively, in a manner similar to that described in connection with the work actuator of Fig. 1.

The two central chambers formed by the piston guide 106 and 107 in cooperation with the piston 105 are provided with fluid pressures of approximately one half of the supply pressure introduced at the supply pipe 8 by passing fluid through the orifices 62, 63 and 62a and 63a into the fluid pressure return pipe 64 similar to that described in connection with the pressure derivative pistons of Fig. 1.

Pressures found within the chamber formed by the piston 105 and the piston guide 107 are introduced into the chambers formed by the enlarged end spool valve portion 34a and the central bore 89 of the valve guide 87 by the pipe 118. Likewise, the pressure found within the chambers formed by the piston chamber 105 and the piston guide 106 are introduced into the chamber formed by the enlarged end spool valve portion 35a and the central bore 90 of the valve guide 88 by a pipe 119.

Typical operation of the species shown in Fig. 3 will now be described. Under static conditions, with no current being received by the first stage torque motor winding 13 and equal fluid flow occuring through the orifices 2 and 3, it can be seen that the pressures within the second stage control pipes 9 and 10 would be equal. Since these pressures are introduced through the pipes 9a and 10a, respectively, into the enlarged central bores 89 and 90 of the end valve guides 87 and 87, respectively, it can be seen that the pressure would be against the end areas of the enlarged end spool valve portions 34 and 35. These pressures being of equal value, the land areas of the end spools being of equal area and the spring bias of the springs 36 and 37 being equal and opposite the central spool valve assembly is centrally positioned. This provides a balance of pressure within the pipes 102 and 103 and in the chambers of the work actuator 42. The balanced pressures within the pipes 102 and 103 therefore, will act with equal force and in opposition on the guide arms 108 and 109 of the piston 105. The equal and opposite forces of the fluid pressure introduced by the pipes 102 and 103 in connection with the biasing springs 112 and 113 therefore, cause the piston 105 to be centrally positioned and in equilibrium.

If we assume now that current of one polarity is supplied to the torque motor winding 13 causing the vane 11 to deflect in one direction, say to the left, as viewed in the drawing, it can be seen that the orifice 2 becomes restricted while the orifice 3 is relieved. Fluid flow is therefore, reduced from the orifice 2 while increased through the orifice 3 causing an increase in pressure within the second stage supply pipe 9 and a decrease in pressure within the second stage supply pipe 10. The increased pressure within the supply pipe 9 acting on the enlarged end spool valve portion 34 then deflects or moves the spool valve assembly 18 to the right as viewed in the drawing an amount proportional to the current supplied to the torque motor winding 13. Movement of the spool valve assembly 18 to the right then causes the central spool valve 23 to uncover the center groove 22 allowing fluid flow from the source pipes 8 and 21 past the spool valve 23 and into the supply pipe 102, the outer chamber formed by the piston guide ring 106 and the end cap 114, and through the pipe 116 into the chambers 53 and 56 of the work actuator 42. At the same time, pressures within the work actuator chambers 54 and 55 are provided with an exhaust path through the pipe 117, the chamber formed by the guide ring 107 and the end cap 115, the supply pipe 103, valve guide peripheral ring opening 96 and radial openings 97 past the end spool valve 35 (in its displaced right-hand position) into the cut away portion 101 of the guide 86 and out through the exhaust pipe 31. It can be seen, therefore, that under these conditions, the rotary vane member 50 would rotate in a counterclockwise direction.

Pressure build up within the outer chamber formed by the piston guide 106 and the end cap 114, and pressure reduction in the other outer chamber performed by the piston guide 107 and the end cap 115 causes the displacement of the pressure derivative piston 105 to its right, as viewed in the drawings. Displacement of the piston 105 to the right, in turn, causes an increase in pressure within the chamber formed between the piston 105 and the piston guide 107 with this increased pressure being introduced through the pipe 118 into the end spool valve chamber formed by the end spool valve portion 34a and the enlarged bore 89 of the end valve guide 87. The enlarged portion 34a with respect to the remainder of the end spool valve 34, forms a differential feedback control area. At the same time, the chamber formed by the piston 105 and the valve guide 106 is reduced in pressure, due to piston movement to the right, causing a reduction in the pressure of the chamber formed by the end portion 35a of the end spool valve 35 positioned within the enlarged central bore 90 of the end valve guide 88. This pressure reduction is introduced through the pipe 119 as previously described. The enlarged portion 35a, with respect to the remainder of the end spool valve 35, also forms a differential feedback control area.

It can be seen that the pressure reduction acting on the differential area of the end spool 35a and pressure increase acting on the differential area of the end spool 34a causes the spool valve assembly 18 to return toward the left as viewed in the drawing, thus reducing fluid flow into the work actuator 42.

As pointed out previously, in the description of the operation of Fig. 1, the deflection of the piston 105 of this species acts in the manner similar to the dual pistons 68 and 68a of Fig. 1 to provide pressure derivative feedback to the second stage valve assembly 18. The action of the feedback pressure introduced through the piston 105 biased by the orifices 62, 63 and 62a, 63a is present during transient conditions for control of fluid flow rate into the work actuator for the purpose of preventing oscillations.

Operation of the vane 11 to the position opposite to the one previously described, that is, to the right restricting orifice 3, would cause deflection of the spool valve assembly 18 to the left with the corresponding deflection of the spool valve to the left causing rotation of the power work actuator in a clockwise direction. Since the action is identical with the previously described action, it will not be described in detail at this time.

Although there is shown only three species of the disclosed invention, it should be clear to those skilled in the art that modifications such as those providing mechanical deflection of the second stage valve assembly 18, rather than hydraulic deflection as described herein could be included.

I claim as my invention:

1. A control valve device having a fluid pressure control port for conveying fluid under pressure to a movable work actuator abutment to effect and control its movement, valve means responsive to a valve-actuating force to regulate supply of fluid under pressure to said control port according to degree of such valve-actuating force, input control means for regulating said valve-actuating force, and pressure derivative feedback means responsive to rate of change of pressure in said control port to effect reduction in said valve-actuating force proportionately to such rate of change.

2. In combination with a work actuator having a work actuator chamber and a movable work actuator abutment subject to pressure of fluid therein, valve means responsive to a valve-actuating force to regulate supply of fluid under pressure to said work actuator chamber according to degree of said valve-actuating force, input control means for regulating said valve-actuating force, and pressure derivative feedback means responsive to rate of change of pressure in said work actuator chamber to effect reduction in said valve-actuating force proportionately to such rate of change, irrespective of displacement of said movable work actuator abutment.

3. In combination with a work actuator having a work actuator chamber and a piston member to be actuated reversibly upon alternate supply and release of fluid under pressure to and from said chamber, valve means movable reciprocably by alternately applied valve-actuating forces to effect alternate supply and release of fluid under pressure to and from said chamber, input control means for regulating said valve-actuating forces, and pressure derivative feedback means responsive to rate of change of pressure in said chamber to effect reduction in said valve-actuating forces proportionately to said rate of change, irrespective of displacement of said piston member, whereby the ratio of valve-actuating force to work actuator chamber pressure is unaffected when pressure in such chamber is not changing, and the valve means and piston member are adequately damped during changes in acceleration or deceleration of said piston member.

4. In combination with a work actuator having a work actuator chamber and a piston member to be actuated reversibly upon alternate supply and release of hydraulic fluid under pressure to and from said chamber, valve means movable reciprocably by alternately applied valve-actuating forces to effect alternate supply and release of hydraulic fluid under pressure to and from said chamber, input control means for regulating said valve-actuating forces, and pressure derivative feedback means responsive to rate of change of pressure in said chamber to effect reduction in said valve-actuating forces proportionately to said rate of change, irrespective of displacement of said piston member, whereby the ratio of valve-actuating force to work actuator chamber pressure is unaffected when pressure in such chamber is not changing, and the valve means and piston member are adequately damped during changes in acceleration or deceleration of said piston member.

5. In combination with a work actuator having a double acting piston member and oppositely arranged pressure chambers to which said piston member is exposed for reversible operation, valve means movable reciprocably by alternately applied differential valve actuating forces for effecting alternate supply and release of fluid under pressure to said pressure chambers, input control means for regulating said valve actuating forces, and pressure derivative feedback means responsive to rate of change in pressures in said chambers to effect reduction in said valve actuating forces according to such rate of change, irrespective of movement of said piston member.

6. A control valve device having a pair of fluid pressure control ports for conveying fluid under pressure to and from opposite sides of a reversible work actuator piston member, piston valve means movable reciprocably by alternately applied differential valve-actuating forces for effecting alternate supply and release of fluid under pressure to and from said control ports, input control means for regulating said valve actuating forces, and pressure derivative feedback means responsive to rate of change in pressures in said control ports to reduce the aforesaid differential valve actuating forces according to such rate of change.

7. In combination with a work actuator having a work actuator chamber and a movable work actuator abutment subject to pressure of fluid therein; valve means responsive to a valve-actuating force to regulate supply of fluid under pressure to said work actuator chamber; input control means for regulating said valve-actuating force; pressure derivative feedback means responsive to rate of change in pressure in said work actuator chamber to establish a feedback pressure acting in behalf of reducing said valve-actuating force according to such rate of change, irrespective of work actuator abutment movement; said pressure derivative feedback mean comprising means defining a pressure derivative conduit in which the aforesaid feedback pressure is established, a pressure derivative piston subject opposingly to pressure of fluid in said work actuator chamber and in said pressure derivative conduit, respectively, means defining an exhaust orifice open to said pressure derivative conduit for dissipating pressure increases in said pressure derivative conduit, whereby the aforesaid feedback pressure exists only during the effecting of a change in work actuator chamber pressure; and means for freely conveying fluid under pressure from said valve means to said work actuator chamber independently of said pressure derivative piston.

8. A control valve device having a fluid pressure supply port adapted to be connected to a source of fluid under pressure and a fluid pressure control port for alternate supply and release of fluid under pressure to and from a work actuator chamber for reversible operation of a work actuator piston means, valve means operable reversibly by alternately-applied oppositely-directed valve-actuating forces, input control means for establishing said valve-actuating forces, and pressure derivative feedback means responsive alternately to rates of increase and decrease in pressure of fluid in said chamber to establish a feedback pressure acting in behalf of reducing said valve-actuating forces by variation of such feedback pressure above and below a datum pressure according to said rate of increase and decrease, respectively, said pressure derivative feedback means comprising means defining a pressure derivative conduit in which said feedback pressure is established, exhaust orifice means opening into said pressure derivative conduit for release of fluid under pressure therefrom, supply orifice means opening from said supply port to said pressure derivative conduit for supply of fluid under pressure thereto to establish the aforesaid datum pressure, a pressure derivative piston subject opposingly to pressure of fluid in said work actuator chamber and in said pressure derivative conduit, and spring bias means acting on said pressure derivative piston in opposition to its movement in opposite directions from a neutral position, wherein increases in pressure of fluid in said work actuator chamber will cause displacement of said pressure derivative piston to cause corresponding increase in feedback pressure in said pressure derivative conduit above said datum pressure according to the rate at which work actuator chamber pressure increases, wherein decreases in pressure of fluid in said work actuator chamber permit displacement of said pressure derivative piston to cause a corresponding decrease in feedback pressure in said pressure derivative conduit below said datum pressure according to rate at which such work actuator chamber decreases, and wherein steady state pressures in said work actuator chamber result in reestablishment of said datum pressure, irrespective of the magnitude of said steady state work actuator chamber pressure.

9. In combination with a fluid pressure supply port and a normally pressurized fluid pressure control port for conveying fluid under pressure to a movable work actuator abutment to effect and control its movement, valve means responsive to a valve actuating force to regulate supply of fluid under pressure to said control port according to the degree of such force, input control means for regulating said valve actuating force, a pressure derivative conduit, the pressure of fluid in which when above a datum value is employed as a feedback pressure acting to reduce the aforesaid actuating force according to rate of change in control port pressure, an exhaust orifice open to said pressure derivative conduit, a supply orifice connecting said fluid pressure supply port to said pressure derivative conduit for pressuring same to the extent of the aforesaid datum value, pressure derivative piston means subject opposingly to control port and pressure derivative conduit pressures, and spring bias means opposing movement of said pressure derivative piston responsively to increase in control conduit pressure.

10. In a servomechanism, the combination of means defining a supply port for connection to a source of fluid under pressure, a control port for conveying fluid under pressure to a work actuator chamber to displace a movable work actuator abutment, and a pressure derivative conduit in which a feedback pressure proportionate to rate of change of control port pressure is established; piston valve means controlling fluid pressure communication between the aforesaid control and supply ports, said piston valve means being subject opposingly to an input force acting in behalf of increased supply of fluid under pressure to said control port and to said feedback pressure; input control means for regulating said input force; and pressure derivative feedback control means for establishing said feedback pressure by variation above and below a datum pressure according to whether control port pressure is increasing or decreasing, said pressure derivative feedback control means including exit orifice means for restricted egress of fluid under pressure from said pressure derivative conduit, inlet orifice means for restricted ingress of fluid under pressure from said supply port, pressure derivative piston means displaced by an increae in control port pressure in opposition by restricted escape of fluid under pressure from said pressure derivative conduit via said exit orifice and displaced oppositely by preponderance in pressure derivative conduit pressure upon decrease in control port pressure in opposition by restricted ingress of fluid under pressure from said supply port into said pressure derivative conduit, and opposed spring means resisting movement of said pressure derivative piston means in either direction of movement from a neutral position corresponding to existence of said datum pressure in said pressure derivative conduit.

References Cited in the file of this patent

UNITED STATES PATENTS

| | | |
|---|---|---|
| 658,915 | Jacobsen | Oct. 2, 1900 |
| 2,210,916 | Kenyon | Aug. 13, 1940 |
| 2,550,723 | Ross | May 1, 1951 |
| 2,560,758 | Burritt | July 17, 1951 |
| 2,647,493 | Whitehead | Aug. 4, 1953 |
| 2,669,973 | Parker | Feb. 23, 1954 |
| 2,698,517 | Witt | Jan. 4, 1955 |
| 2,738,772 | Richter | Mar. 20, 1956 |
| 2,797,666 | Chubbuck | July 2, 1957 |
| 2,889,815 | Lloyd | June 9, 1959 |
| 2,910,968 | Massey | Nov. 3, 1959 |
| 2,931,343 | Moog | Apr. 5, 1960 |
| 2,931,389 | Moog et al. | Apr. 5, 1960 |